(12) United States Patent
Pavesi et al.

(10) Patent No.: US 10,146,508 B2
(45) Date of Patent: Dec. 4, 2018

(54) TRUE RANDOM NUMBER GENERATOR

(71) Applicant: TRENTINO SVILUPPO S.P.A., Rovereto (IT)

(72) Inventors: Lorenzo Pavesi, Trento (IT); Paolo Bettotti, Levico Terme (IT); Massimo Cazzanelli, Novaledo (IT); Leonardo Gasparini, Pergine Valsugana (IT); Nicola Massari, Pergine Valsugana (IT); Georg Pucker, Pergine Valsugana (IT); Anna Rimoldi, Castellanza (IT); Massimiliano Sala, Trento (IT); Alessandro Tomasi, Trento (IT)

(73) Assignee: Trentino Sviluppo S.P.A., Rovereto (TN) (IT)

( * ) Notice: Subject to any disclaimer, the term of this patent is extended or adjusted under 35 U.S.C. 154(b) by 0 days.

(21) Appl. No.: 15/329,961

(22) PCT Filed: May 29, 2015

(86) PCT No.: PCT/IB2015/054077
§ 371 (c)(1),
(2) Date: Jan. 27, 2017

(87) PCT Pub. No.: WO2016/016741
PCT Pub. Date: Feb. 4, 2016

(65) Prior Publication Data
US 2017/0249125 A1    Aug. 31, 2017

(30) Foreign Application Priority Data
Jul. 30, 2014    (IT) .............................. VI2014A0200

(51) Int. Cl.
*G06F 7/58*    (2006.01)
*G06F 17/11*    (2006.01)

(52) U.S. Cl.
CPC .............. *G06F 7/588* (2013.01); *G06F 17/11* (2013.01)

(58) Field of Classification Search
None
See application file for complete search history.

(56) References Cited

U.S. PATENT DOCUMENTS

| | | | |
|---|---|---|---|
| 7,930,333 B2* | 4/2011 | Vartsky | ................... G06F 7/588 708/255 |
| 2004/0139132 A1* | 7/2004 | Lutkenhaus | ............ G06F 7/588 708/250 |

(Continued)

FOREIGN PATENT DOCUMENTS

| | | |
|---|---|---|
| GB | 2 457 328 A | 8/2009 |
| WO | 02/091147 A1 | 11/2002 |

OTHER PUBLICATIONS

You-Qi Nie et al., *Practical and Fast Quantum Random Number Generation Based on Photon Arrival Time Relative to External Reference*, Applied Physics Letters, vol. 104, No. 5, Feb. 3, 2014, pp. 051110-1-051110-4.

(Continued)

*Primary Examiner* — David H Malzahn
(74) *Attorney, Agent, or Firm* — Workman Nydegger

(57) ABSTRACT

A random number generator includes a photon source and one or more photon detectors of the SPAD type (311) configured to detect a photon flow equal to λ, wherein the photons are generated by the photon source. The random number generator furthermore includes an electronic sampler. The electronic sampler is configured in such a way as to detect the arrival time t of a photon incident on each SPAD photon detector (311) for each one of the observation windows Tw, and are also configured in such a way as to convert the arrival time t into a binary sequence. In the generator of the invention the photon source and the elec- (Continued)

tronic sampler are configured in such a way that the product $\lambda*Tw$ is lower than or equal to 0.01.

10 Claims, 2 Drawing Sheets

(56) References Cited

U.S. PATENT DOCUMENTS

| | | | | |
|---|---|---|---|---|
| 2006/0010182 A1* | 1/2006 | Altepeter | ................ | G06F 7/58 |
| | | | | 708/250 |
| 2015/0261502 A1* | 9/2015 | Sartor | .................... | G06F 7/588 |
| | | | | 359/107 |
| 2017/0249125 A1* | 8/2017 | Pavesi | .................... | G06F 7/588 |

OTHER PUBLICATIONS

International Search Report and Written Opinion dated Sep. 28, 2015, issued in PCT Application No. PCT/IB2015/054077, filed May 29, 2015.

\* cited by examiner

TRUE RANDOM NUMBER GENERATOR

BACKGROUND OF THE INVENTION

1. Field of the Invention

The present invention concerns a random number generator (RNG), in particular a true random number generator (TRNG), of the improved type.

2. Present State of the Art

It is known that random number generators are presently used in several applications ranging from the field of science to that of cryptodiagramy. In the first case, a typical example is that of computational science, which requires the generation of a certain number of initial random states serving as a description of the initial state of the simulation.

This type of application generally requires that the initial configurations are not strictly correlated with one another, but that they can be reproduced in a deterministic manner in order to make it possible to verify, for example, the effect of variations on the codes that carry out the simulations. For this reason, these sequences are more correctly defined as pseudo random numbers (PRN), because they are defined through complex algorithms that start from an initial value. In other words, given an initial random number, which in technical jargon is called "seed", a formula, even if very complex, will constantly reproduce the same sequence of random numbers. The corresponding generators are defined as pseudo random number generators (PRNG).

On the contrary, in the second case, that is, in the case of use of random numbers in cryptodiagramy techniques for the execution, for example, of banking operations, this approach is weak, as it is necessary to ensure the total unpredictability of the generated sequences, in such a way as to keep highly sensitive information safe. In this case, the safest approach can be achieved through the generation of random numbers obtained from a generation process that is really random and does not allow the generated sequence to be predicted in any way. These generators, in fact, are known as true random number generators (TRNG). In particular, the quantum mechanisms, like for example the generation of photons by a light source, are among the most investigated methods for obtaining said sequences of true random numbers and are based on the indetermination of the measured event which is inherent in the properties of the quantum system itself.

From the point of view of the theory of information, the level of unpredictability of the random numbers generated through both of said two techniques can be expressed by means of the parameter defined as "entropy", which in fact is known as the measure of uncertainty or information in a random variable.

Furthermore, it is important to underline that the National Institute of Standards and Technology (NIST) with its directive NIST SP800-22 specifies approximately fifteen statistical tests that make it possible to determine whether a given random number generator has a sufficient level of entropy or not.

As already mentioned, the use of pseudo random number generators for cryptodiagramy purposes is risky, not only because certain algorithms have weaknesses that potentially are revealed only some time after their introduction, but also because if an ill-intentioned subject should recover the seed from which all the random sequences are generated, all the successive outputs based on the same seed could be predicted with absolute certainty.

A solution based on physical and in particular quantum phenomena is therefore highly preferable, given the intrinsic unpredictability of these events, even for subjects having a perfect knowledge of the algorithms used and having a high calculation capacity at their disposal. However, while the algorithms for the generation of pseudo random numbers can be selected to create sequences having some statistical properties determined with absolute certainty owing, in fact, to their deterministic nature, the random numbers obtained starting from physical phenomena are subject to practical limitations due, for example, to variations in the instrument manufacturing quality, to fluctuations in power supply, to environmental factors such as external fields and sudden temperature changes. In general, these deviations from the ideal case determine a deviation from a uniform and independent statistic distribution of the events that can be measured in a sample space. Consequently, it is possible to observe a lower level of entropy also in said true random number generators.

In order to avoid the above, said true random number generators need a further step, called a "post-processing" step, performed downstream of the extraction of the sequence of random codes starting from the specific physical phenomenon. This post-processing step, in fact, makes it possible to improve the uniformity of probability distribution of the sequence of random codes. However, to disadvantage, said post-processing step affects the so-called "bit rate" that can be ensured by the generator.

It is also known, as already mentioned above, that one of the physical phenomena that are most exploited for the generation of true random numbers is quantum photonics. For this reason, said generators belonging to the macro category of TRNG generators are also indicated more specifically by the acronym QRNG (Quantum Random Number Generator). In these generators, in fact, an attenuated light source generates few photons (low value of the detected photon flow $\lambda$) that are acquired by one or more detectors of individual photons, each one of which is known by the acronym SPAD (Single Photon Avalanche Diode). Furthermore, the system is provided with specific electronic circuitry located downstream of said SPADs, usually one or more TDCs (Time to Digital Converter), capable of extracting a random sequence of bits from each one of said SPADs. More precisely, in these generators the photons obey to a Poisson process, meaning that the acquired events are independent of one another and that the probability of counting n photons within an observation window $T_w$ follows the Poisson distribution:

$$P(x=n) = \frac{e^{-\lambda T_w}(\lambda T_w)^n}{n!}$$

where $\lambda$ indicates, in fact, the detected photon flow.

The detected photon flow $\lambda$, the characteristics of the SPAD detectors and the bit extraction modes determine the final performance of the generator.

The above having been stated, different types of random number generators based on the QRNG concept are available on the market. These generators, in particular, cover a wide variety of applications, ranging from USB portable devices that offer just a few hundred kbits to large electronic systems capable of guaranteeing a bit rate of hundreds of Mbits. In literature, furthermore, different logic structures and architectures have been proposed for determining the sequences of true random numbers starting from a physical phenomenon, in particular from the detection of photons. Most of them detect the "arrival time" or the number of photons incident on the sensitive surface of the SPAD generator/generators.

In particular, as regards the technique based on the so-called arrival time, a proposal has been made according to which the time elapsing between the moment when a photon is incident on an individual SPAD and the moment when the successive photon is incident on the same SPAD should be measured. These measurements are successively ordered within adjacent time portions with the same duration into which the observation window $T_w$ of each SPAD is subdivided. Based on the time portion within which said measurement falls, a corresponding random sequence of bits is generated and extracted.

However, although this technique makes it possible to obtain a high bit rate, it has a considerable bias due to the fact that, as already explained, the photon source obeys to said Poisson process.

According to the known art, in order to overcome the above mentioned drawback action should be taken directly on the photon source, appropriately checking the photon flow generated by the same photon source. This operation, in particular, includes the step of varying the bias current of the photon source in such a way as to make its statistical distribution over time as uniform as possible.

However, to disadvantage, according to this approach, special electronic circuitry capable of varying the bias current of the photon source, as described above, need to be introduced in the generator, which increases the complexity and the size of the generator itself.

SUMMARY OF THE INVENTION

The present invention intends to overcome the drawbacks mentioned above.

In particular, the invention has the purpose to provide a true random number generator that makes it possible to guarantee a high level of entropy in such a way as to pass at least the NIST statistical tests.

It is a further object of the invention to provide a true random number generator that makes it possible to obtain a high bit rate in the generation of random bit sequences.

It is another object of the invention to provide a true random number generator whose structure is more compact, less complex and requires less energy consumption compared to the random number generators of the known art.

Again, it is another object of the invention to provide a true random number generator with a high level of safety against any tampering with its internal components.

It is another, yet not the least object of the invention to provide a true random number generator that is more economical than the generators of the known art.

The objects mentioned above are achieved by the true random number generator having the characteristics described herein.

In particular, the true random number generator of the invention, comprising a photon source with detected photon flow $\lambda$ and electronic sampling means with observation windows $T_w$, is characterized in that said photon source and said electronic sampling means are configured in such a way that the product $\lambda * T_w$ is lower than or equal to 0.01.

Further characteristics of the true random number generator of the invention are described herein.

In particular, the fact that the components that make up the true random number generator of the invention are made so that they are integrated in a single silicon substrate, advantageously makes it possible to obtain a generator that is more compact and less subject to tampering than the generators of the known art.

BRIEF DESCRIPTION OF THE DRAWINGS

The said objects, together with the advantages that will be described here below, are highlighted in the description of a preferred embodiment of the invention that is provided by way of non-limiting example with reference to the attached drawings, wherein.

DETAILED DESCRIPTION OF THE PREFERRED EMBODIMENTS

Figure 1A:
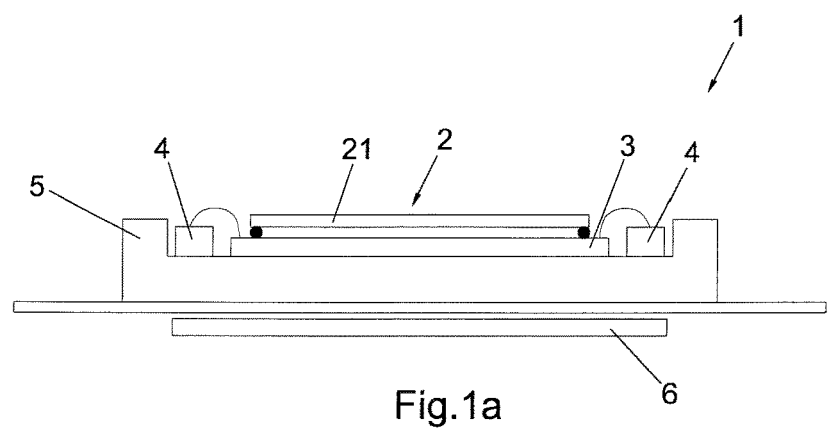
FIG. 1a shows a schematic view of the architecture of the random number generator of the invention.

The random number generator (RNG) that is the subject of the invention, in particular the true random number generator (TRNG) of the invention, is schematically represented in FIG. 1a, where it is indicated by 1.

As can be observed in FIG. 1a, the random number generator 1 of the invention comprises a photon source 2 having a detected photon flow equal to $\lambda$.

Figure 1B:
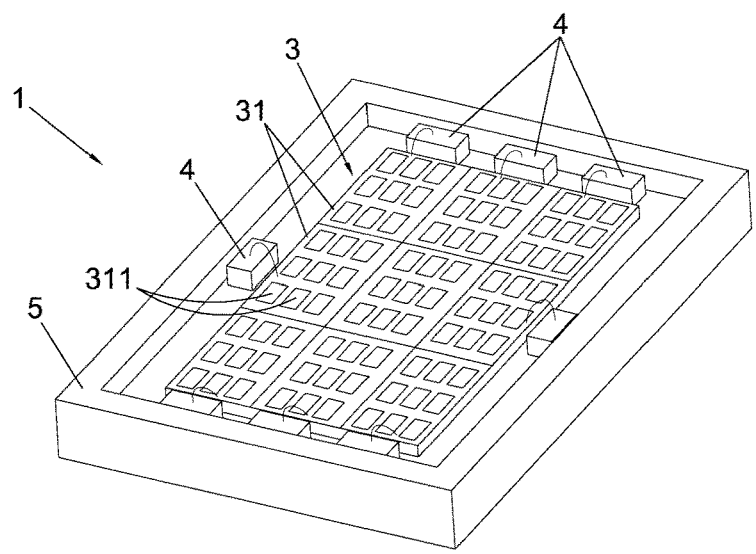
FIG. 1b shows a schematic axonometric view of the array of detectors of the random number generator of the invention.

According to the preferred embodiment of the invention, the random number generator 1 furthermore comprises, as shown in FIG. 1b, an array 3 of photon detectors 311 of the SPAD type. In particular, as already mentioned above, a single SPAD detector 311 is capable of collecting and supplying as on output the information concerning the incidence of a single photon on its sensitive surface and possibly the arrival time of said single photon within an observation window with pre-established duration $T_w$. Between two successive observation windows $T_w$, the SPAD detector 311 undergoes a processing step during which the initial conditions are restored, called dead time $T_{dead}$ in technical jargon, during which the same SPAD 311 cannot detect any photon.

The random number generator 1 of the invention, as schematically shown in FIG. 1a, comprises also electronic sampling means 4 operatively connected to said array 3 of SPAD detectors 311.

Figure 2:
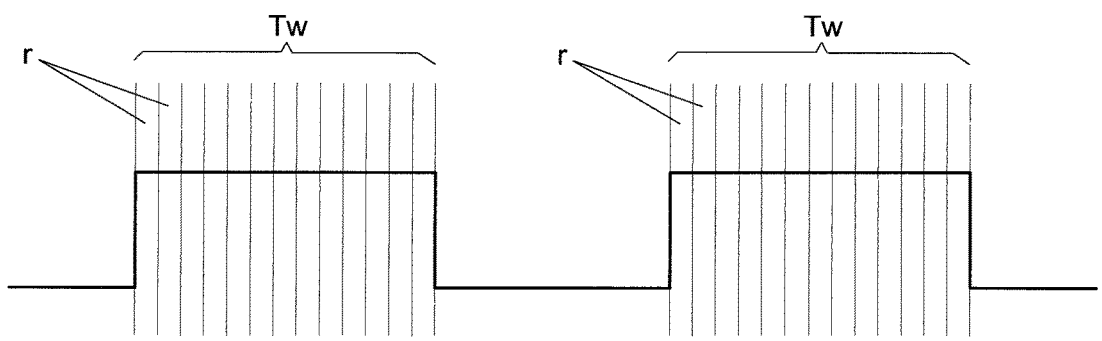
FIG. 2 shows an observation window with duration $T_w$ subdivided in r time portions having the same duration.

Said electronic sampling means 4 are configured to detect the arrival time t of a photon incident on each one of the SPAD detectors 311 belonging to the array of SPAD detectors 3, for each one of the observation windows $T_w$. Furthermore, the same electronic sampling means 4 are configured in such a way as to convert each detected arrival time t into a binary sequence with length equal to $n = \log_2 r$, where r represents the number of time portions having the same duration into which each observation window with duration $T_w$ is subdivided in advance, as schematically shown in FIG. 2.

The value assumed by said binary sequence depends on the specific time portion within which said detected arrival time t falls.

According to the invention, the photon source 2 and the electronic sampling means 4 are configured in such a way that the product $\lambda * T_w$ between the detected photon flow $\lambda$ and the duration $T_w$ of each observation window is lower than or equal to 0.01.

As shown here below, said characteristics advantageously makes it possible to obtain a distribution of probability of the arrival times of the photons that is essentially linear and substantially uniform. Consequently, said relationship between said two quantities $\lambda$ and $T_w$ makes it possible to increase the entropy level of the random number generator 1 of the invention.

In particular, it has been shown that, preferably but not necessarily, in the case where the instruments used are not the ideal solution, a greater uniformity of the distribution of probability of the arrival time of the photons, and therefore a higher entropy level of the generator 1 of the invention, are obtained with a value of said product $\lambda * T_w$ lower than or equal to 0.001.

Said values have been determined by means of theoretical analyses, Monte Carlo simulations and empirical measurements, which have made it possible to establish that the random number generator 1 of the invention, configured as described above, has a level of entropy that is at least sufficient to pass the NIST statistical tests.

In particular, the analysis carried out was based on two assumptions. The first concerns the fact that in a Poisson process, like the one to which the photons generated by the light source 2 obey, the difference between any random time and the successive event follows an exponential distribution of the type $1-e^{-\lambda t}$, where $\lambda$ is the number of detected events. The second assumption is that the most reliable measurement of the deviation from a uniform statistical distribution, in the case where the observation window $T_w$ is subdivided into a plurality of said time portions r, is obtained by means of the so-called total variation distance (TVD).

In greater detail, the value of said total variation distance is equal to:

$$TVD(P,Q)=\|P-Q\|=\tfrac{1}{2}\Sigma\omega\in\Omega|P(\omega)-Q(\omega)|$$

where P and Q are two probability measures defined in the sample space $\Omega$ of measurable events $\omega$.

The above having been explained, it can be easily shown that by subdividing said exponential distribution into said number r of time portions having the same duration, if the first time portion comprises the interval $t_i$, then the $m^{th}$ time portion r will represent the time interval $t\in[(m-1)t_i, mt_i)$ and will comprise a probability density equal to:

$$\rho(m) = \varepsilon(mt_i; \lambda) - \varepsilon((m-1)t_i; \lambda)$$
$$= e^{-(m-1)\lambda t_i}(1 - e^{-\lambda t_i})$$

where $\varepsilon(t; \lambda)$ is the cumulative distribution function of an exponential random variable with rate parameter $\lambda$ at time t.

Figure 3:
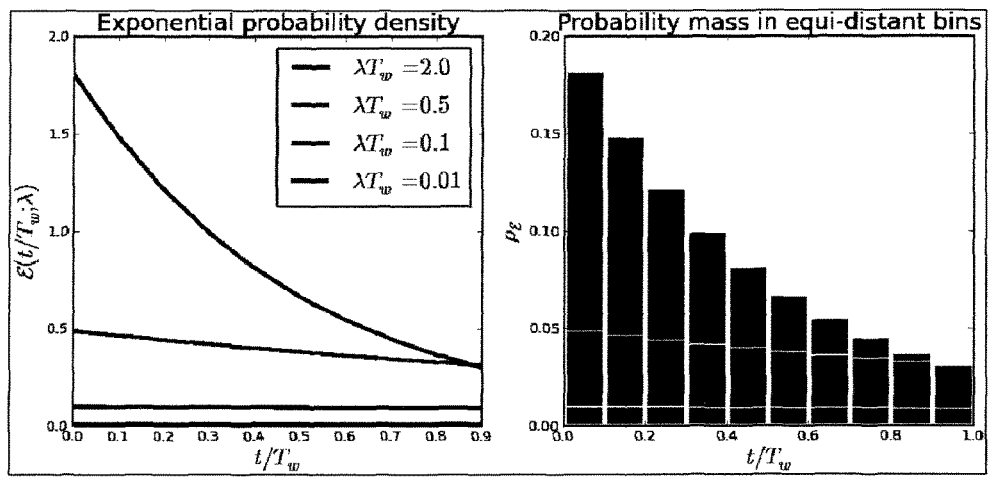
FIG. 3 shows first diagrams relating to the distribution of probability for different values of the product $\lambda * T_w$, in particular for different values of $\lambda$.

FIG. 3 shows the graphic results obtained through the simulation, respectively, of the exponential distribution of probability and of the probability density for different values of $\lambda$, with a number of time portions r equal to 10 and with an observation window $T_w$ with unit value.

It can be understood from that equation and above all from said diagrams that as the value of the detected photon flow $\lambda$ decreases, the probability density tends to straighten.

Furthermore, the value of the TVD, in said conditions, is proportional to the photon count. In particular, a TDV≈0.01, considered acceptable, is obtained with the product $\lambda T_w = 1/100$.

Figure 4:
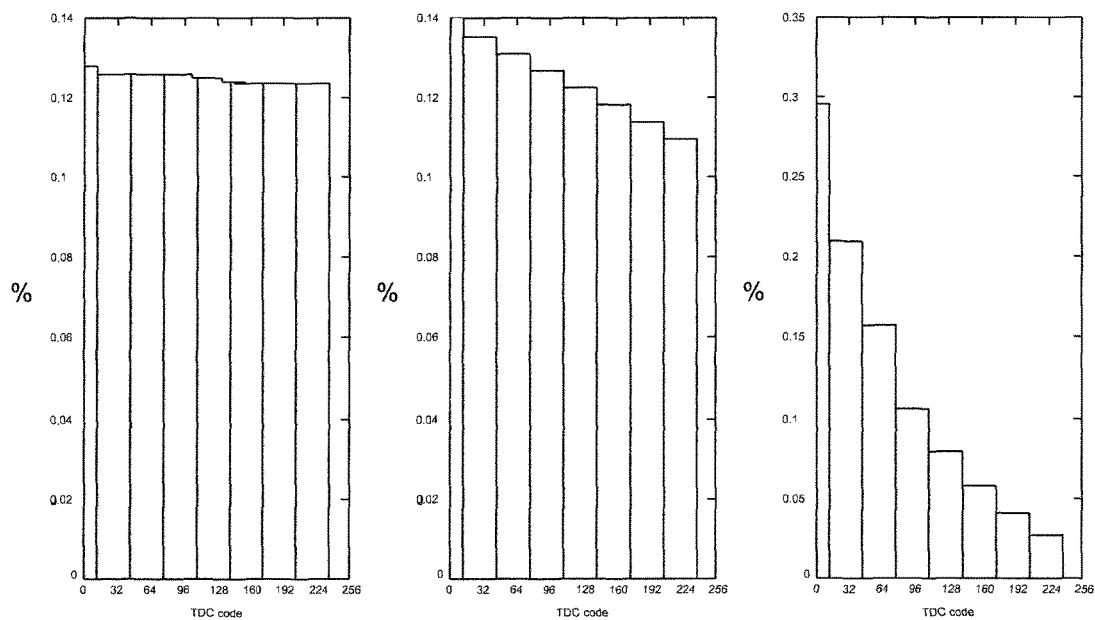
FIG. 4 shows second diagrams relating to the distribution of probability for different values of the product $\lambda * T_w$, in particular for different values of $T_w$.

FIG. 4 shows a further graphic representation of the probability density distribution, in this case maintaining the detected photon flow $\lambda$ constant, for example at $10^6$ counts/s and varying the duration $T_w$ of the observation window. In particular, in the first diagram on the left the observation window $T_w$ has been selected so that it is equal to 0.1 ns, in the second diagram $T_w$=1 ns, while in the last diagram on the right $T_w$>10 ns. It is evident that with $T_w$=0.1 ns the distribution is essentially uniform, with $T_w$=1 ns the distribution is substantially linear, while with $T_w$>10 ns the distribution is neither uniform nor linear, with a consequent reduction of the entropy level of the system. Also in this case, as is evident, the best result is obtained when the product $\lambda T_w$ is equal to $10^6*(0.1*10^{-9})=0.01$.

In this way it has been shown that, according to the invention, by configuring the product $\lambda T_w$ between the detected photon flow $\lambda$ and the duration $T_w$ of the observation window of the generator 1 so that it is equal to or lower than 0.01 a substantially uniform distribution is obtained and, therefore, the generator 1 has a high entropy level.

Returning to the architecture of the random number generator 1, according to the preferred embodiment of the invention said photon source 2 and the array 3 of SPAD detectors 311 are made in such a way that they are integrated in a single silicon substrate 5.

In greater detail, the photon source 2 and the array 3 of SPAD detectors 311 are made on said silicon substrate 5 through the technique of microfabrication of CMOS integrated circuits.

Advantageously, said integration allows the random number generator 1 of the invention to be constructed in such a way that it is more compact and structurally less complex than the generators of known type.

In particular, according to the preferred embodiment of the invention, the photon source 2 is a LED device 21. For this reason, said integrated LED device 21 is called Si-LED 21.

It cannot be excluded, however, that in different embodiments of the invention said photon source 2 can be a LED device of the discrete type installed on a support card belonging to the random number generator 1 of the invention or the same photon source 2 can be of a type different from a LED device.

According to the preferred embodiment of the invention, the array 3 of SPAD detectors 311 is subdivided in groups 31 of SPAD detectors 311, each group 31 comprising a predefined number of SPAD detectors 311.

Each one of said groups 31 of SPAD detectors 311 is managed independently of the remaining groups 31 by special electronic sampling means 4 mentioned above.

Said independent management of the various groups 31 of SPAD detectors 311 advantageously makes it possible to parallelize the extraction of the random binary sequences from the random number generator 1, thus increasing the bit rate of the latter.

It cannot be excluded, however, that in different embodiments of the invention said array 3 of SPAD detectors 311 is not subdivided in groups 31 of SPAD detectors 311, but is controlled by common electronic sampling means 4.

Furthermore, it cannot be excluded that in an alternative embodiment of the invention said generator 1 may comprise a single SPAD detector 311.

Regarding the coupling between said Si-LED 21 and the array 3 of SPAD detectors 311, this is preferably but not necessarily made in a direct manner.

Said direct coupling advantageously makes it possible to maximize the photon flow incident on the sensitive surfaces of the array 3 of SPAD detectors 311. Furthermore, it makes it possible to avoid any possible bias of the statistical distribution that may occur in different architectures using a splitter of the photon flow if said splitter is not correctly balanced. In practice, the direct coupling makes it easier to control the instrument and makes it possible to avoid significant deviations from the initial operating conditions due to drifts.

Finally, still advantageously, said direct coupling makes it possible to simplify the architecture of the random number generator 1 of the invention, as there is no need to manufacture an optical circuit integrated between said two components.

It cannot be excluded, however, that in different embodiments of the invention the coupling between the Si-LED 21 and the array 3 of SPAD detectors 311 can be obtained in an indirect manner, through the interposition of suitable waveguides.

As already mentioned above, according to the preferred embodiment of the invention each group 31 of SPAD detectors 311 is operatively connected with its own electronic sampling means 4. In particular, said electronic sampling means 4, associated with a specific group 31 of SPAD detectors 311, are configured to detect the arrival time t of a photon incident on each SPAD 311 and also to identify on which SPAD detector 311 said photon is incident at the arrival time t. This characteristic, thanks to which it is possible to identify the specific SPAD detector 311 on which the photon is incident, advantageously makes it possible to know the distribution of each element belonging to the group of SPADs 31, even if common electronic sampling means 4 are used.

Therefore, the use of electronic sampling means 4 that are shared by a group 31 of SPAD detectors 311 and at the same time are capable of determining on which one of said detectors 311 a photon is incident at a given arrival time t, makes it possible to maintain a high level of entropy of the entire random number generator 1 of the invention and at the same time to reduce the size of the latter.

It cannot be excluded, however, that in alternative embodiments of the invention said electronic sampling means 4 are shared by the entire array 3 of SPAD detectors 311 or that each SPAD detector 311 is provided with its own electronic sampling means 4.

Furthermore, according to the preferred embodiment of the invention, each one of said electronic sampling means 4 comprises a TDC device (Time to Digital Converter) 41.

Finally, always according to the preferred embodiment of the invention, also said electronic sampling means 4 are made in such a way that they are integrated in said silicon substrate 5.

Preferably but not necessarily, the random number generator 1 of the invention furthermore comprises electronic post-processing means 6 configured to receive the binary sequences extracted from said electronic sampling means 4 as an output, said electronic sampling means being in turn associated with each one of said groups 31 of SPAD detectors 311.

Furthermore, said electronic post-processing means 6 are configured to process said binary sequences in such a way as to carry out a so-called "whitening" cycle. The term "whitening" indicates an operation of decorrelation capable of transforming sequences of random binary codes possibly bound by a covariance matrix M into new sequences of random binary codes whose covariance is the identity matrix. In other words, said new sequences of random binary codes are uncorrelated and they all have a variance value equal to 1. Consequently, to advantage, said further post-processing step makes it possible to further increase the entropy level of the same random number generator 1 of the invention.

By way of example, said electronic post-processing means 6 are configured to process the binary sequences received as an input through the Von Neumann algorithm.

It cannot be excluded, however, that in different embodiments of the invention said electronic post-processing means 6 can be configured to process said binary sequences through a hash function algorithm, a block cipher algorithm, or multiplications by a matrix created specifically for this purpose, provided that they are capable of further increasing the entropy of the random number generator 1 of the invention per output bit.

According to the above, therefore, the random number generator 1 of the invention achieves all of the set objects.

In particular, it achieves the object to provide a true random number generator that makes it possible to ensure a high entropy level, in such a way as to pass at least the NIST statistical tests.

Furthermore, the invention also achieves the object to provide a true random number generator that makes it possible to obtain a high bit rate in the generation of random bit sequences.

The invention also achieves the object to provide a true random number generator that has a more compact and less complex structure and requires less energy consumption compared to the random number generators of the known art.

The invention furthermore achieves the object to provide a true random number generator having a high level of safety against any tampering with its internal components.

Finally, the invention also achieves the object to provide a true random number generator that is more economical than the generators of the known art.

The invention claimed is:

1. A random number generator of the type comprising:
    a photon source;
    one or more photon detectors of the SPAD type configured in such a way as to detect a flow of photons equal to $\lambda$, said photons being generated by said photon source;
    electronic sampling means configured in such a way as to detect the arrival time t of a photon incident on each one of said SPAD photon detectors for each one of a plurality of observation windows following one another and with duration $T_w$, said electronic sampling means being furthermore configured in such a way as to convert said arrival time t into a binary sequence with length equal to $n=\log_2 r$, r being the number of time portions having the same duration into which each one of said observation windows with duration $T_w$ is subdivided, said binary sequence assuming a value that depends on the specific time portion within which said arrival time t falls,
    wherein the photon source and said electronic sampling means are configured in such a way that the product $\lambda * T_w$ between the detected photon flow $\lambda$, measured in photons per unit time, and the duration $T_w$, measured in the unit time, of each observation window is less than or equal to 0.01 photons.

2. The random number generator according to claim 1, wherein the photon source and said electronic sampling means are configured in such a way that the product $\lambda * T_w$ between the detected photon flow $\lambda$ and the duration $T_w$ of each observation window is less than or equal to 0.001 photons.

3. The random number generator according to claim 1, further comprising an array of SPAD photon detectors subdivided into several groups, each one of said groups being operatively connected to its own electronic sampling means configured in such a way as to identify the SPAD detector on which a photon has been detected at a specific arrival time t, independently of the electronic sampling means associated with other groups of SPAD detectors.

4. The random number generator according to claim 1, wherein the electronic sampling means comprise one or more TDC (Time to Digital Converter).

5. The random number generator according to claim 1, wherein the photon source and said one or more SPAD photon detectors are made so that they are integrated in a single silicon substrate.

6. The random number generator according to claim 5, wherein the photon source and said one or more SPAD photon detectors are made on said silicon substrate through the technique of microfabrication of CMOS integrated circuits.

7. The random number generator according to claim 5, wherein the photon source is a Si-LED component made on said silicon substrate.

8. The random number generator according to claim 1, further comprising electronic post-processing means configured so as to receive said binary sequence extracted by said electronic sampling means as an input and to process said binary sequence in such a way as to increase the entropy value per output bit of said generator.

9. The random number generator according to claim 8, wherein the electronic post-processing means are configured so as to process said binary sequence through a Von Neumann algorithm.

10. The random number generator according to claim 8, wherein the electronic post-processing means are configured so as to process said binary sequence through a hash function algorithm.

* * * * *